Feb. 15, 1927.
H. F. HEIMBURGE
BAIT
Filed Oct. 19, 1926
1,618,083
Fig. 1.
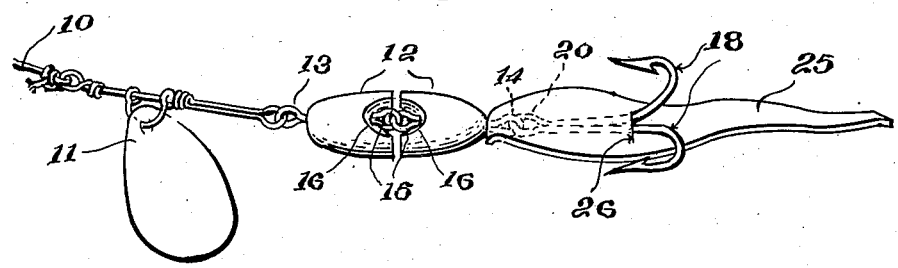
Fig. 2.
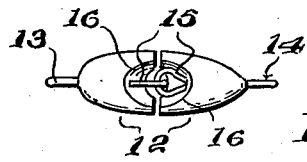
Fig. 3.
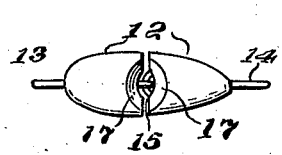
Fig. 4.
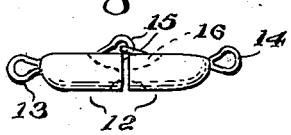
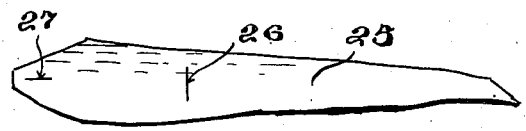
Fig. 5.
Fig. 6.  Fig. 7.
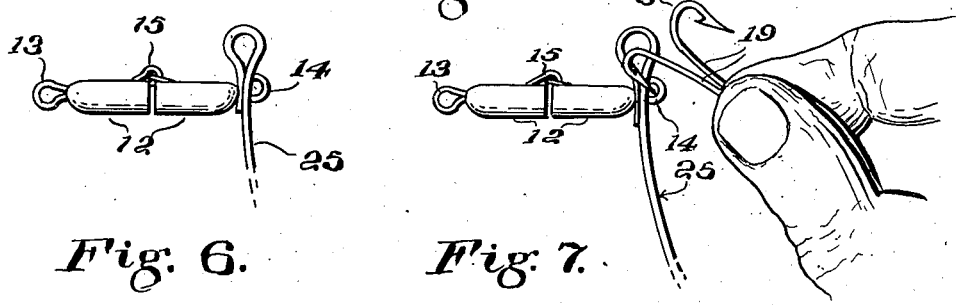
Inventor:
Herman F. Heimburge,
By H. S. Woodward,
Attorney Patented Feb. 15, 1927.

1,618,083

UNITED STATES PATENT OFFICE.

HERMAN F. HEIMBURGE, OF TROY, NEW YORK.

BAIT.

Application filed October 19, 1926. Serial No. 142,592.

The invention has for an object to effect an improvement in artificial bait, and aims especially to provide an element of novel construction well adapted to be associated with other bait elements to cooperate therewith in a novel way, as well. It is an important aim to provide a very simple and cheaply manufactured device of the kind which will be highly efficient and liable in a minimum degree to derangement, as well as being readily manipulated by inexperienced anglers to good advantage.

Additional objects, advantages and features of invention reside in the construction, arrangement and combination of parts, which will be understood from the following description and accompanying drawings, in Figure 1 of which the bait is shown in use after one method.

Figure 2 is a top view of the bait body.

Figure 3 is a bottom view thereof,

Figure 4 is a side elevation thereof.

Figure 5 is a detail of a preferred method of shaping a pork-rind comprising a part of this bait.

Figure 6 illustrates a stage of procedure in the application of the pork-rind to the bait.

Figure 7 shows a further stage of manipulation in applying the rind.

There is illustrated in Figure 1 a portion of a fish-line 10, on which a bait is carried, comprising my invention but in advance of the bait there is shown a spoon device 11 attached in accordance with usual practice, and which does not itself comprise a novel part of my invention, but when so used cooperates with the bait element therebehind. There is shown an articulated bait body 12, cast or otherwise formed of solid metal such as brass or copper, in a stream-line form, somewhat rounded at the forward or left-hand end, and slightly more tapered toward the rear end. An eye 13 is affixed to the forward extremity of the bait-body slightly above the longitudinal axis or the center of gravity, as may be seen in Figure 4, and a similar eye 14 may be likewise fixed at the rear end of the bait body. The bait-body is divided transversely approximately midway of its length, the two sections being connected by the equivalent of a universal joint, in the present instance consisting of two inter-engaged eyes 15 of wire embedded in or formed on respective sections of the bait-body, and arranged in planes at right angles to each other. It is desired to form the bait-body with an articulation in a manner to present an appearance of continuity as nearly as possible, and for this purpose the upper side of the sections are recessed at their abutting ends to contain the eyes, as shown at 16 in Figure 2, these recesses permitting the necessary free movement of the eyes relatively to each other for free flexing action of the parts, and novel sinuous movements which are induced when the parts are in action, as will be described.

The eye 15 in each section is contained principally within the recess of the section, and the eyes are connected to each other between the sections in such manner that they engage mutually against longitudinal pull adjacent or above the top of the bait-body, so that it is quite free to flex upwardly, but has limited flexing action downwardly as may be appreciated from Figure 4, there being a very slight spacing between the bait-body sections at the middle when they are arranged on a common longitudinal axis. The two sections of the bait-body are also provided with smaller recesses 17 on the bottom side somewhat similar to the recesses on the top side, which recesses have the purpose of aiding in causing peculiar movements of the bait by the action of water thereupon when the bait is drawn through the water while submerged. The recesses in the upper side of the bait-body serve to lighten it, which, together with the attachment of the eyes 13 and 14 above the center of gravity of the bait serve to cause the positioning of the bait with the top side uppermost when it is drawn through the water by the forward eye 13.

There is shown engaged on the rear eye 14 a double hook 18 of familiar construction, the two hooks thereof having respective shanks extended from the opposite sides of an eye-portion 20, of which they form an integral continuation. The shanks are slightly separated at their junction with the eye, but spaced not quite the thickness of the wire of which the eye 14 is formed, so that when the eye 14 is engaged in the eye 20, liability of casual derangement of the parts from proper operative relation is minimized. A pork-rind 25 is shown, having a forward apertured end engaged snugly around the smaller part of the eye 14, while the shanks of the hooks 18 are extended through a short transverse slot 26 intermediately located in the pork-rind a short distance rearwardly of its forward end, in a broad part of the rind. The rind is broad at the foward part and tapered toward the rear extremity. The slot 26 engages around the shanks of the hooks adjacent the bights of the hooks, and the double hook is so engaged upon the eye 14 that the points of the hook may be located at the upper side of the rind and also projected upwardly when the bait-body 12 is arranged with recesses 16 at the upper side. However, it will be seen that the hooks and the pork-rind are free to oscillate on the eye 14 freely and in all directions. In the attachment of the pork-rind and hooks 18 the rind is cut with a longitudinal slit 27 at its forward end, and the transverse slit 26 is then made at a distance from the outer end of the first slit corresponding to the distance from the base of the eye 14 to the points on the shanks of the double hook where the shanks are to pass through the rind, as shown in Figure 1. The hooks 18 being disengaged from the eye 14, the slot 27 of the rind is first engaged over the eye 14, and the bait looped between the two slits and the intermediate slit 26 then forced also over the eye 14 and thrust forwardly against the body of the bait while the point of one of the hooks is inserted through the eye 14, after the manner shown in Figure 7. The hooks being drawn into position, with the eye 14 engaged in the common eye 20 of the hook-shanks, the slit 26 in the bait is then forced rearwardly over the eye 14 and the hook-shanks until it reaches the position indicated in Figure 1, when the bait is ready for use.

A spoon 11 being connected to the forward end of the bait-body as shown in Figure 1, and the pork-rind being applied as described, when the assembly is drawn through the water the operation of the spoon in conjunction with the particular construction of my bait results in a very sinuous action of the bait which has been found highly efficient in inducing fish to strike thereon. The articulation of the bait-body in the manner shown permits the rear portion to set at a slight angle to the upper portion, in response to water pressure as necessary and adds further to the certainty with which the bait maintains one side upwardly at all times, in addition to contributing to the sinuous motion of the bait assembly. Further, the manner of attaching the bacon rind permitting as it does a relative pivotal movement of the rind and hook with relation to the rear section of the bait body, adds further to the flexibility of the parts and the sinuous motion of the assembly with an inexpensive construction. It is an especially important advantage of my bait that in trolling, by the action of the bait-body, the hooks are maintained with the points upwardly, and by the method of attaching the pork-rind, the bait operates as a nonfouling bait and hook, the pork-rind tending to ride over the marine growth which might otherwise become engaged in the hook; and at the same time the hooks are maintained in a position to most efficiently snare a striking fish.

I claim:

1. In a bait of the character described, a bait body of stream-line form divided transversely, the forward and rear parts having universal pivot connection, and a combined food bait and hook portion having a universal pivot connection with the rear extremity of said body.

2. In a bait of the character described, a stream-line body divided transversely, and having recesses opening on the mutually abutting parts, respective eye members in each section within the recess, the two eyes interengaged to form a pivot, located above the center of gravity of the parts when alined and means to connect other elements at the extremity of each section.

3. The structure of claim 2 including also a hook detachably connected to the rear extremity of the said body, and a rind-like element apertured at the forward extremity and intermediately, and receiving the hook and connection therethrough, said hook projecting upwardly therefrom.

In testimony whereof I affix my signature.

HERMAN F. HEIMBURGE.